Aug. 31, 1943.     G. WHITE     2,328,404
GLASS TEMPERING
Filed April 28, 1941
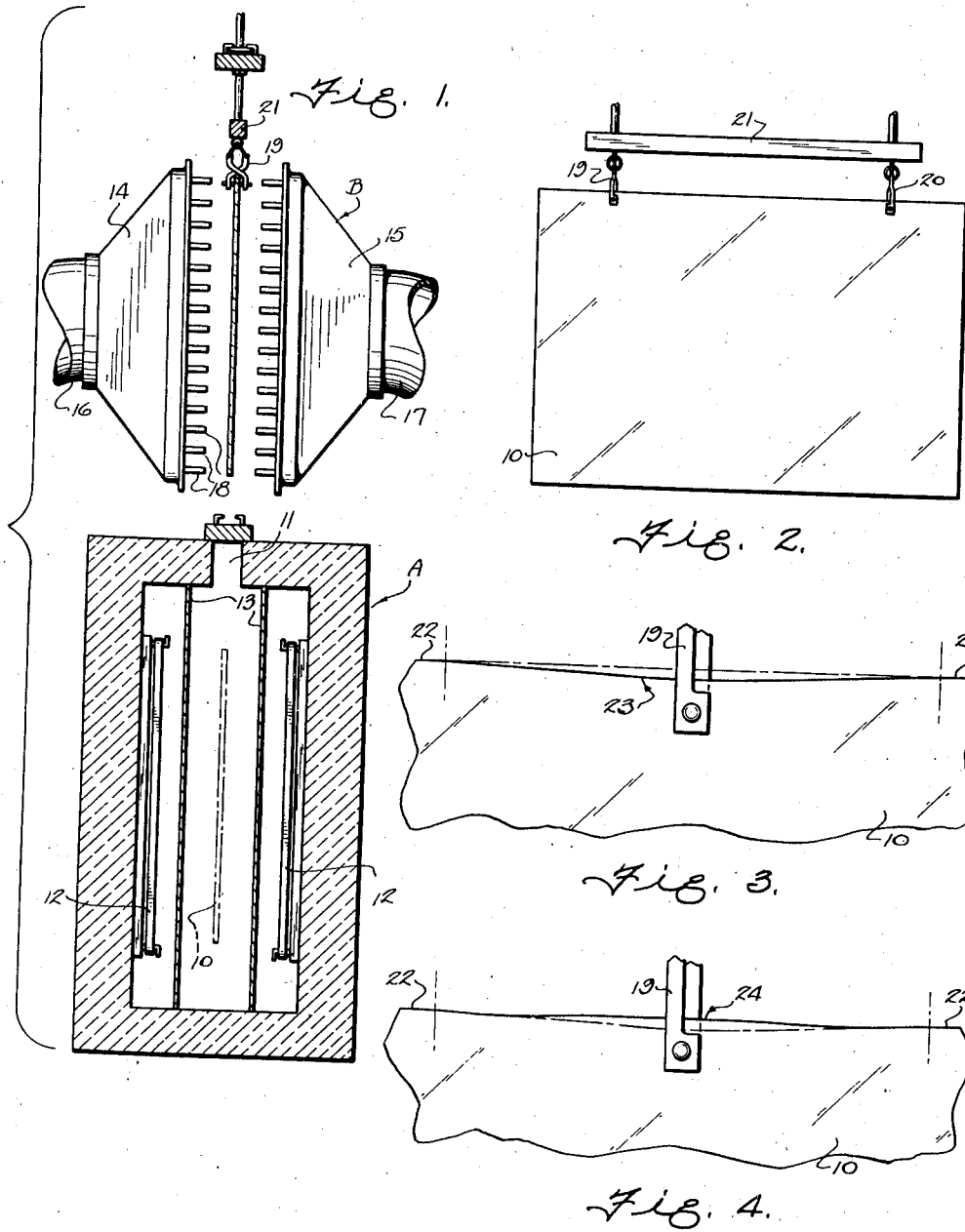
Inventor
GERALD WHITE.
By
Frank Fraser
Attorney Patented Aug. 31, 1943

2,328,404

UNITED STATES PATENT OFFICE 2,328,404

GLASS TEMPERING

Gerald White, Toledo, Ohio, assignor to Libbey-Owens-Ford Glass Company, Toledo, Ohio, a corporation of Ohio Application April 28, 1941, Serial No. 390,700

2 Claims. (Cl. 49—89)

The present invention relates broadly to the tempering of glass and more particularly to improvements in the supporting of sheets or plates of glass during the treatment thereof.

In the tempering of glass sheets according to one known process, the sheets are first heated to approximately the point of softening of the glass and then suddenly cooled to place the outer surfaces of said sheets under compression and the interiors thereof under tension. The treatment of the sheets in this manner not only materially increases the mechanical strength of the glass but further modifies its breaking characteristics in that, when broken, the glass sheet will disintegrate into innumerable small and relatively harmless particles instead of breaking into large dangerous pieces or slivers as is the case with ordinary glass sheets.

In the practice of the above process, the glass sheets are ordinarily supported in a vertical position during the tempering thereof, and it is customary to suspend or hang the sheet from a plurality of relatively small tongs or hooks which engage opposite faces of said sheet near its upper edge. The hanging of the sheet in this manner is, however, open to some objection due to the fact that upon heating and softening of the glass, the weight of the sheet causes a slight vertical stretching thereof, particularly at those points which are engaged by the supporting hooks or tongs. It has also been heretofore customary to cut the sheet to the exact shape desired and as a consequence the vertical stretching of the sheet upon softening thereof resulted in the formation of small protuberances or humps which projected beyond the upper edge of the sheet. The presence of these protuberances resulted in the deforming of the surface outline or contour of the sheet and were highly objectionable not only from the standpoint of appearance but also because they rendered the sheet oversize at these points, sometimes exceeding the tolerance specified by the customer, resulting in rejection of the glass. These protuberances would not be so objectionable were it possible to trim the sheet after tempering, but glass so tempered cannot be subsequently cut since any attempt at cutting will cause a complete shattering of the glass.

It is the principal aim and object of this invention to eliminate the above objectionable feature by the provision of an improved method of hanging the glass sheet during the tempering thereof whereby the formation of such protuberances at the upper edge of the sheet will be avoided. Briefly, this is accomplished by forming notches or indentations in the upper edge of the glass sheet at those points to be engaged by the supporting tongs to offset the vertical stretch of the sheet at such points upon softening of the glass.

Other objects and advantages of the invention will become more apparent during the course of the following description when taken in connection with the accompanying drawing.

In the drawing wherein like numerals are employed to designate like parts throughout the same:

Fig. 1 is a view of one form of tempering apparatus which may be employed in carrying out the present invention, the means for heating the glass sheet being shown in section and the cooling means in elevation;

Fig. 2 is a side elevation of the supporting means for the glass sheet;

Fig. 3 is a view illustrating the manner in which the upper edge of the glass sheet is notched at those points where it is engaged by the supporting tongs; and Fig. 4 is a similar view illustrating the manner in which the notched portions of the sheet are stretched during tempering.

In the form of tempering apparatus illustrated in Fig. 1, the means for heating the glass sheets comprises a furnace designated in its entirety by the letter A while the means for subsequently chilling or cooling the sheets is designated generally by the letter B. The cooling means B is preferably arranged directly above the furnace A so that the glass sheet 10, after being heated within the furnace, can be transferred directly to the cooling means without any undue loss of heat and without being adversely affected by atmospheric conditions during the transfer.

The furnace A is preferably of an electrically heated type and is provided with a top opening 11 through which the glass sheets 10 to be treated may be inserted and removed. Any suitable removable covering may be used for the opening 11 as will be readily understood. For the purpose of heating the furnace, electrical heating elements 12 may be used in conjunction with baffle plates 13. By means of any conventional indicating and control mechanism, the temperature of the furnace can be regulated to heat the glass sheet 10 to approximately its point of softening which is ordinarily in the neighborhood of 1250 degrees Fahrenheit for flat glass.

When the glass sheet 10 has been heated to the desired temperature in the furnace, it is lifted therefrom through the top opening 11 and subjected immediately to the action of the cooling means B, said means comprising spaced blower heads 14 and 15 connected by conduits 16 and 17 respectively to suitable blowers so that blasts of air can be directed simultaneously upon opposite surfaces of the glass sheet when brought into position between said blower heads. Each blower head is preferably provided with a plurality of nipples 18 through which jets or blasts of air are directed against the sheet surfaces.

It will of course be appreciated that the present invention is not limited to the use of the specific type of means herein disclosed for heating and/or for cooling the glass sheets.

The glass sheet 10 is supported during the tempering thereof by a pair of relatively small hooks or tongs 19 and 20 which engage the sheet closely adjacent its upper edge and also adjacent the opposite ends thereof, said tongs being carried by a suitable supporting bar or the like 21. By means of the tongs 19 and 20, the glass sheet is hung or suspended in a vertical position from its upper end as clearly shown in Figs. 1 and 2.

As brought out above, it has heretofore been customary to cut the glass sheet before tempering to the exact shape and size desired and to suspend the sheet from tongs engaging the same near its upper edge. Also, that upon heating of the glass to its point of softening, the weight of the sheet would cause a vertical stretching thereof, particularly at the points of support or, in other words, where the sheet is engaged by the supporting tongs, resulting in the formation of protuberances or humps projecting beyond the upper edge of the sheet. This is particularly true when the glass sheets are bent between a pair of convex and concave mold members while suspended vertically in the above manner. Thus, when the glass is being bent, there is a downward pull at the tongs and especially so when making relatively deep cross bends.

According to this invention, the formation of the protuberances referred to above is avoided by notching or indenting the upper edge of the glass sheet during the cutting thereof at those points to be engaged by the tongs 19 and 20 to offset or compensate for the vertical stretch of the sheet at these points upon softening of the glass and/or bending thereof. Thus, as shown in Fig. 3, the upper edge 22 of the glass sheet 10 is formed with a notch or indentation 23 at each point where it is to be engaged by one of the tongs 19 or 20 and, upon hanging the sheet, the tongs 19 and 20 engage the sheet near its upper edge and substantially intermediate the opposite ends of the respective notch 23 or, in other words, at the deepest point thereof.

Upon heating of the glass to its point of softening and/or during bending thereof, the sheet will be stretched vertically in the same manner as heretofore at those points where it is engaged by the tongs, but this stretching will not be sufficient to cause the formation of protuberances or humps which project beyond the upper edge of the sheet. This is due to the fact that the depth of the notches or indentations 23 is so controlled as to just offset or compensate for the stretch at the tongs whereby the glass at these points will not extend beyond the upper edge of the sheet. This is clearly illustrated in Fig. 4 wherein the upper edge of the notched portion, after being stretched, is indicated at 24 and, as shown, is in substantial alignment with the upper edge 22 of the sheet. By way of example only, it has been found that a notch four inches long and having a depth of three-sixty-fourths of an inch at its center is satisfactory although in large sheets, the depth of the notch may be as much as three-thirty-seconds of an inch.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In the tempering of glass sheets, wherein the sheet is suspended in a vertical position from a plurality of tongs or the like engaging the same near its upper edge and first heated and then suddenly cooled, the method of preventing the formation of protuberances in the upper edge of the sheet at those points which are engaged by said tongs comprising forming depressions of predetermined depth in the upper edge of the sheet directly above the points of attachment of the tongs with said sheet, heating the sheet to approximately the point of softening of the glass to cause a vertical stretching of said sheet at the said points of support to bring the depressed portions into substantial alignment with the upper edge of said sheet, and then cooling the said sheet.

2. In the tempering of glass sheets, wherein the sheet is suspended in a vertical position from a plurality of tongs or the like engaging the same near its upper edge and first heated and then suddenly cooled, the method of preventing the formation of protuberances in the upper edge of the sheet at those points which are engaged by said tongs comprising forming depressions of greater length than depth in the upper edge of the glass sheet, bringing the tongs into engagement with the sheet directly below said depressions and intermediate the ends thereof, heating the sheet to approximately the point of softening of the glass to cause a vertical stretching of said sheet at the points of engagement of the tongs therewith to bring the depressed portions into substantial alignment with the upper edge of said sheet, and then cooling the said sheet.

GERALD WHITE.